(12) United States Patent
Denninghoff

(10) Patent No.: US 7,809,843 B1
(45) Date of Patent: Oct. 5, 2010

(54) GLOBALLY UNIQUE IDENTIFICATION IN COMMUNICATIONS PROTOCOLS AND DATABASES

(75) Inventor: Karl Denninghoff, Bothell, WA (US); Paul A. Mendonsa, legal representative, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 1346 days.

(21) Appl. No.: 10/943,107

(22) Filed: Sep. 16, 2004
(Under 37 CFR 1.47)

Related U.S. Application Data

(60) Provisional application No. 60/504,421, filed on Sep. 18, 2003, provisional application No. 60/509,282, filed on Oct. 6, 2003.

(51) Int. Cl.
*G06F 15/16* (2006.01)
(52) U.S. Cl. .................. 709/228; 709/227; 709/229; 709/247; 380/247; 370/259; 713/190
(58) Field of Classification Search .............. 709/227, 709/228, 229, 247; 370/259, 270; 380/247, 380/255, 269; 713/190
See application file for complete search history.

(56) References Cited

U.S. PATENT DOCUMENTS

| 6,718,394 | B2* | 4/2004 | Cain ........................ 709/242 |
| 7,382,762 | B2* | 6/2008 | Chmora et al. ............. 370/342 |
| 7,421,578 | B1* | 9/2008 | Huang et al. ................ 713/163 |
| 2003/0012149 | A1* | 1/2003 | Maggenti et al. ............ 370/260 |
| 2003/0046238 | A1* | 3/2003 | Nonaka et al. ................ 705/51 |
| 2003/0070067 | A1* | 4/2003 | Saito ......................... 713/150 |
| 2003/0165230 | A1* | 9/2003 | Reuss .................... 379/265.02 |
| 2004/0064572 | A1* | 4/2004 | Yamaguchi et al. ......... 709/229 |
| 2004/0073512 | A1* | 4/2004 | Maung ........................ 705/51 |
| 2004/0073679 | A1* | 4/2004 | Martens et al. ............. 709/227 |
| 2004/0098609 | A1* | 5/2004 | Bracewell et al. ........... 713/200 |
| 2006/0168253 | A1* | 7/2006 | Baba et al. ................. 709/229 |

* cited by examiner

*Primary Examiner*—Alina N. Boutah
(74) *Attorney, Agent, or Firm*—Blakely, Sokoloff, Taylor & Zafman LLP

(57) ABSTRACT

A globally unique identification system for a communications protocol and database is disclosed. A method for generating the globally unique identification code and for generating a compressed globally unique identification code is also described. The communications protocol permits multiple communications sessions to be sent through a single open port of a firewall.

34 Claims, 9 Drawing Sheets

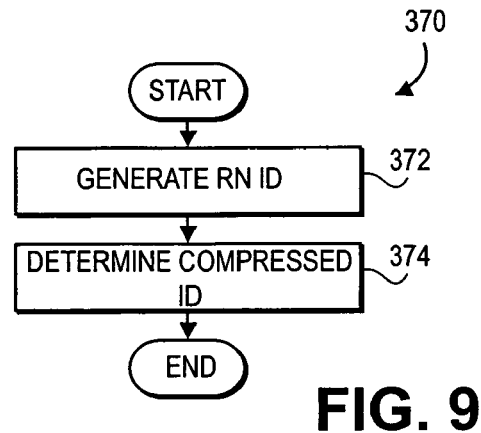
FIG. 9
| LENGTH | | CAPACITY | |
|---|---|---|---|
| ∅ | BYTES | 1 | CALLS |
| 1 | BYTES | 256 | CALLS |
| 2 | BYTES | 64K | CALLS |
| ⋮ | | ⋮ | |
| 16 | BYTES | $3.4 \times 10^{38}$ | CALLS |
FIG. 10A
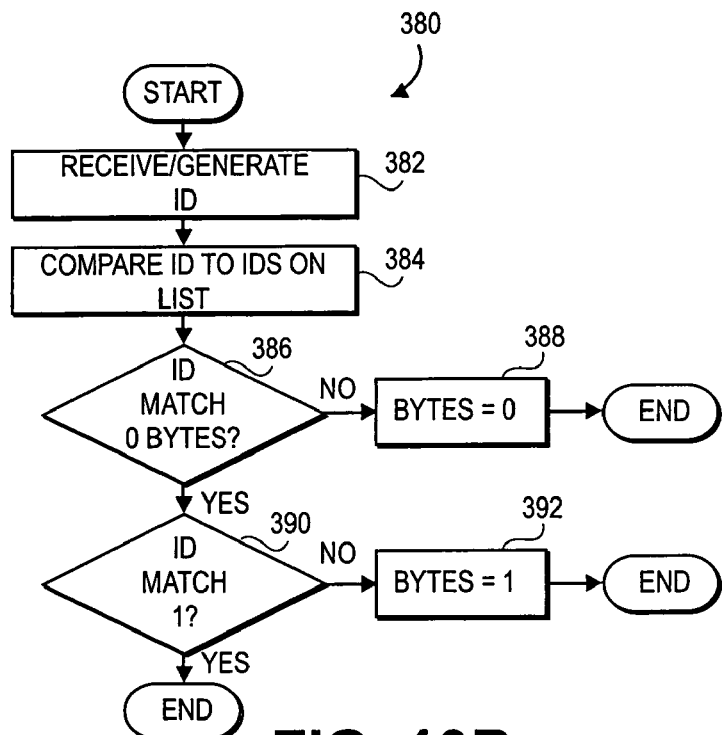
FIG. 10B

GLOBALLY UNIQUE IDENTIFICATION IN COMMUNICATIONS PROTOCOLS AND DATABASES

PRIORITY CLAIM

This patent application claims priority under 35 USC 119(e) from U.S. Provisional Patent Application Ser. No. 60/504,421 filed on Sep. 18, 2003 and entitled "Globally Unique Identification In Communications Protocols And Databases" and claims priority under 35 USC 119(e) from U.S. Provisional Patent Application Ser. No. 60/509,282 filed on Oct. 6, 2003 and entitled "Group Intercom, Delayed Playback, and Ad-Hoc Based Communications System and Method", both of which are incorporated herein by reference.

FIELD OF THE INVENTION

The invention relates generally to a communications protocol for a wireless communications system and in particular to a system and method for an efficient, packet-loss resistant communications protocol that utilizes globally unique identification codes.

BACKGROUND OF THE INVENTION

Any type of communications system has an associated communication protocol that governs the data being sent in each direction over the communications system. For example, the Internet and computer networks have communications protocols, such as TCP/IP. Furthermore, different applications that communicate over the Internet have their own protocols, such as simple mail transfer protocol (SMTP) for e-mail applications. A protocol specifies the data and commands that are communicated between the parties. Most communications protocols are a request and response type protocol in which one party generates a request and expects to receive a response prior to continuing communications. A typical protocol is therefore very susceptible to packet loss during the communications session. For example, in a typical protocol, the loss of a response packet may delay or derail the communication between the parties.

In most communications protocols, it is important to be able to uniquely identify each communications session at a particular time. For example, it is important to be able to distinguish each communications session from every other communications session. In the context of an e-mail communications protocol, the header of an email message will identify the sender and intended recipient of the email message. In the context of a voice communications session, such as a voice over IP call, it is necessary to differentiate the digital data streams associated with each conversion. In more detail, it is desirable to avoid collisions between the telephone calls and their digital data streams wherein two distinct data streams are identified by the same identifier. It is also desirable to avoid identifier collisions when the identification of those calls is stored in a database. Furthermore, if one wants to merge several databases of telephone calls, it is desirable to have a unique identification for each telephone call. In most current systems, a particular identification for a telephone call is often re-used so that it is likely that a collision will occur. Thus, it is desirable to provide a globally unique identification for communications protocols and databases and it is to this end that the present invention is directed.

SUMMARY OF THE INVENTION

A globally unique identification for communications protocols and databases is provided. In a preferred embodiment, the globally unique identification is generated using a random number so that the identification code may be transmitted without encryption. The globally unique identification code in accordance with the invention does not disclose any personal information of the user. In addition, it is unlikely that two identical randomly generated identification codes will exist so that the identification code is globally unique.

The globally unique identification number may be used as part of a communication protocol in which multiple communications sessions may be transmitted through a firewall using a single port of a transport protocol, called a pinhole in the firewall. In the communications protocol, a compressed identification code is generated which reduces the overhead bits in each data packet.

In accordance with the invention, a communications system for communicating a plurality of voice communication sessions over a computer network is provided. The system has a first personal computing device having a communications application being executed by the first personal computing device and a second personal computing device having a second communications application being executed by the second personal computing device, the second communications application establishing a communication session with the communications application of the first personal computing device over a computer network. Each communication application in each personal computing device also has a session manager and a library that generates a globally unique random number identifier wherein, for each communication session, the globally unique random number identifier is generated that uniquely identifies each communication session. The session manager also has computer instructions to generate a compressed globally unique identification, from the globally unique random number identifier, that is appended to each data packet exchanged with another session manager, the compressed globally unique identification having a length that is less than the length of the globally unique random number identifier and being generated based on any other active communication sessions associated with the particular communication application so that the compressed globally unique identification, for a particular communication session between the first and second personal computing devices, of the first personal computing device may be different from the compressed globally unique identification of the second personal computing device.

In accordance with the invention, a method for communicating data over a communications network is provided. In the method, a command packet and a data packet are generated to communicate the data over the communications network. The command packet has at least an identification portion and compressed identifier length portion wherein the identification portion containing an identifier code comprising a predetermined number of random bits. The compressed identifier length portion contains the length of a compressed identifier whose length is shorter than the predetermined number of random bits. The data packet has data and a compressed identifier portion containing a compressed identifier having the length contained in the compressed identifier length portion of the command packet. During the communications method, the command packet is periodically communicated during a communications session so that the identifier code is periodically communicated over the communications network.

In accordance with another aspect of the invention, a method for generating a compressed identifier for a particular communication session associated with a communications device is provided. During the method, a list of compressed identifiers associated with a plurality of communication sessions is maintained in the communications device wherein the particular communication session has already been assigned an identifier having a first length from which the compressed identifier is generated. In the method, a zero length compressed identifier is assigned if the zero length compressed identifier uniquely identifies the communication session based on a comparison with the list of compressed identifiers. If the zero length compressed identifier does not uniquely identify the communication session, a one unit length compressed identifier is assigned if the one unit length compressed identifier uniquely identifies the communication session based on a comparison with the list of compressed identifiers so that the shortest length compressed identifier is used to identify each communication session.

In accordance with the invention with yet another aspect of the invention, a personal computing device for use within a communications network is provided. The device has a communications application, being executed by a processor of the personal computing device that can establish a communication session with a communications application of another personal computing device over a communications network. The communications application further comprises a session manager and a library that generates a globally unique random number identifier wherein, for each communication session, a globally unique random number identifier is generated that uniquely identifies each communication session. The session manager generates a compressed globally unique identification, from the globally unique random number identifier, that is appended to each data packet exchanged with another session manager, the compressed globally unique identification having a length that is less than the length of the globally unique random number identifier and being generated based on any other active communication sessions associated with the communication application so that the compressed globally unique identification, for a particular communication session between the personal computing device and another personal computing device, may be different from the compressed globally unique identification of the other personal computing device.

In accordance with the invention, a method for adjusting a compressed identifier for a communication session during the communications session is provided. In the method, a compressed identifier is assigned having a length to a particular communications session associated with a communications device and is stored the compressed identifier in a list, the compressed identifier length being selected based on a plurality of other communication sessions associated with the communications device. Then, it is determined if the status of one of the other communication session has changed so that the compressed identifier of the other communication session is removed from the list. Then, the compressed identifier of the particular communication session is compared to the list of compressed identifiers. Next, a new length is assigned to the compressed identifier of the particular communications session based on the comparison of the compressed identifier of the particular communication session to the list of compressed identifiers so that the compressed identifier has a minimum length to uniquely identify the particular communication session and the compressed identifier is adjusted during the communication session.

BRIEF DESCRIPTION OF THE DRAWINGS

FIG. 9 is a flowchart illustrating a method for generating a compressed globally unique identification in accordance with the invention;

FIGS. 10A-10C are diagrams illustrating a compressed identification length determination method and example in accordance with the invention;

DETAILED DESCRIPTION OF A PREFERRED EMBODIMENT

The invention is particularly applicable to a communications protocol and globally unique identification for a voice over IP (VoIP) wireless communications system and it is in this context that the invention will be described. It will be appreciated, however, that the globally unique identification and communications protocol in accordance with the invention described herein has greater utility since the globally unique identification and/or communications protocol may be used with any communications system and is not limited to, for example, a voice over IP wireless system. For example, the globally unique identification or communications protocol may be used with conventional wireless telephony systems (both digital cellular and 3G systems), computer network systems, multimedia sessions and the like. The well-known session initiation protocol (SIP) might be improved utilizing the above communications protocol. Now, an example of a VoIP communication system, which may utilize the globally unique identification and the communications protocol in accordance with the invention, will be described.

Figure 1A:
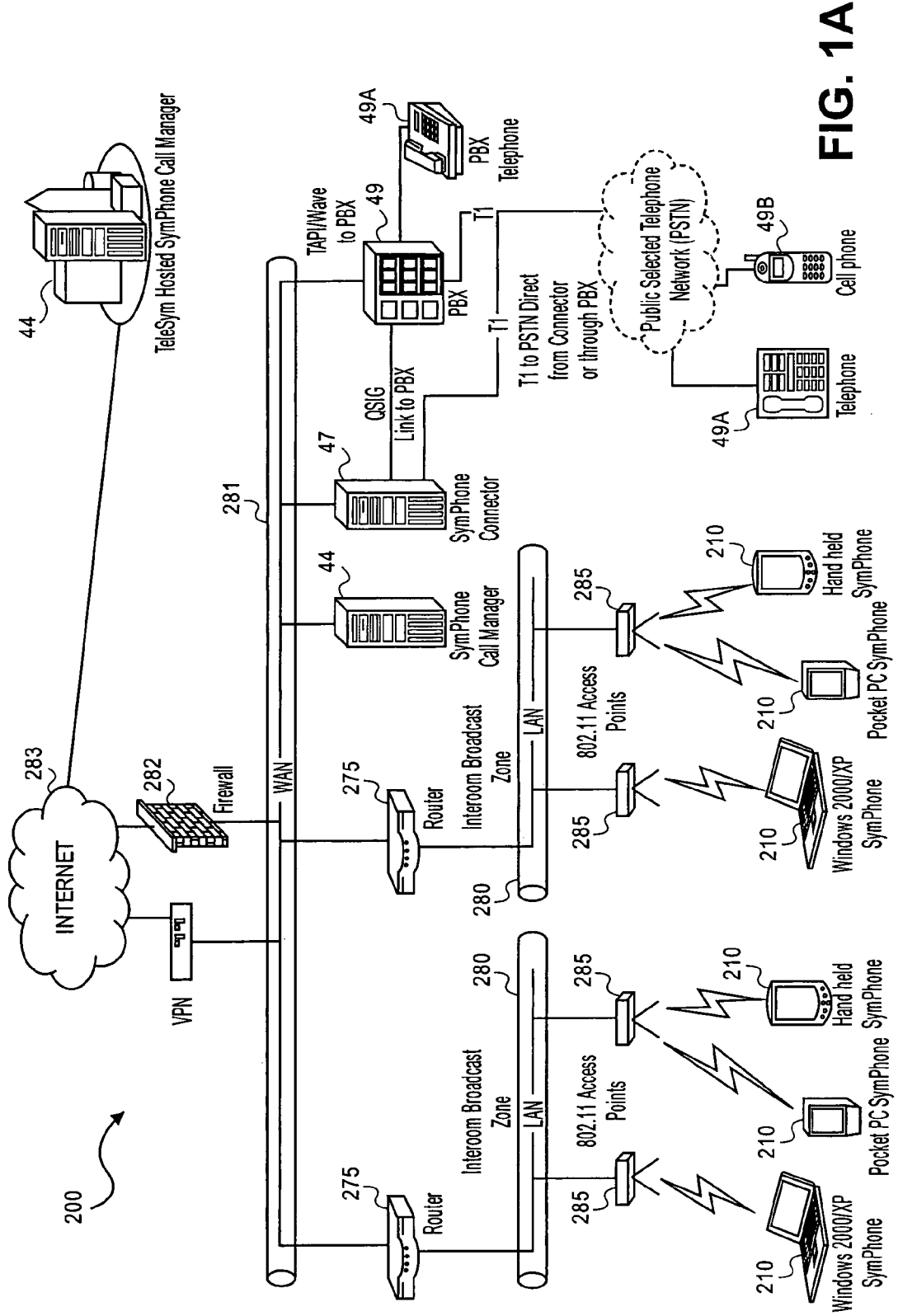
FIGS. 1A and 1B are diagrams illustrating a voice over IP wireless communications system.
Figure 1B:
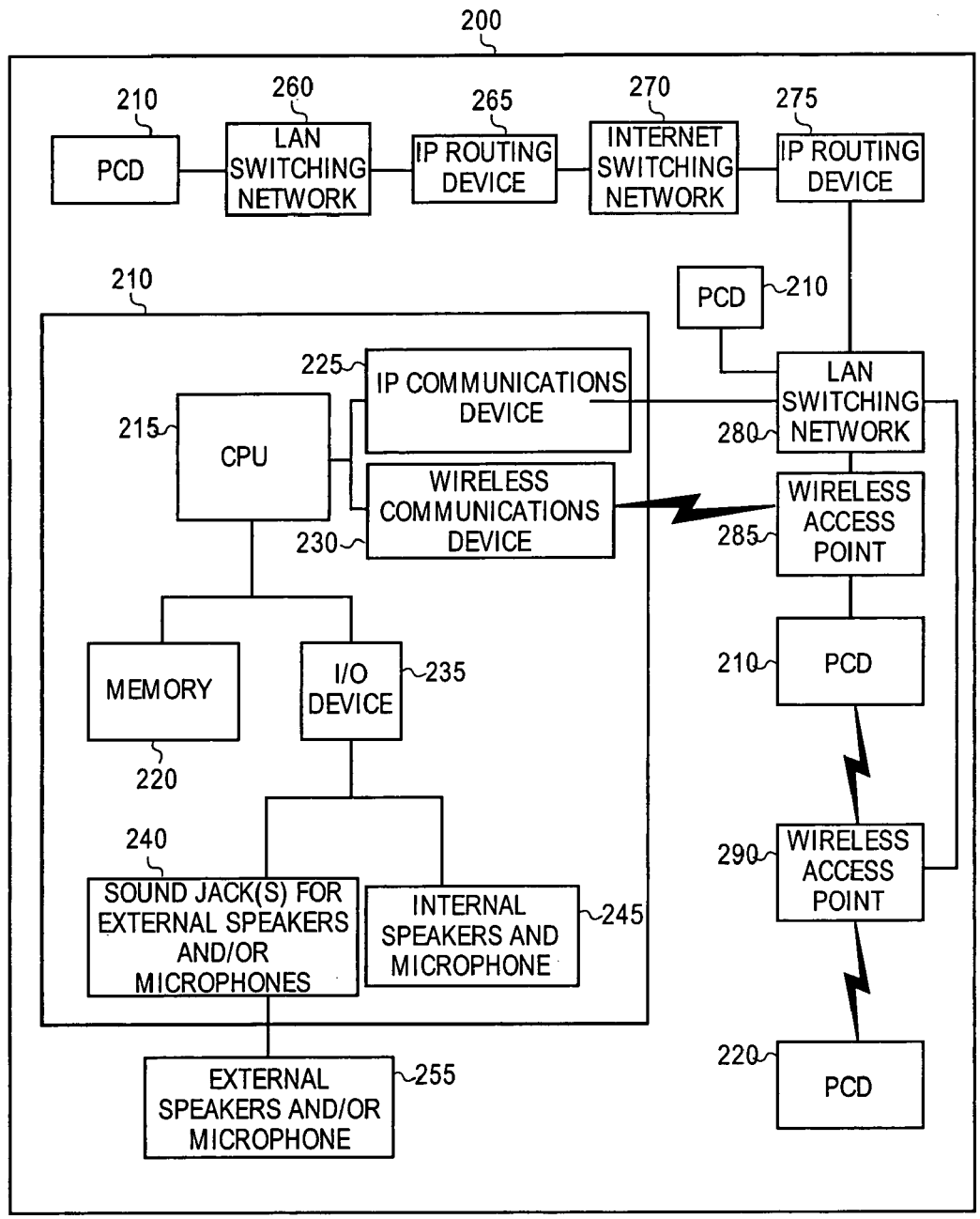

FIGS. 1A and 1B are block diagrams illustrating a wireless voice over IP communications system. In particular, FIG. 1A is a block diagram illustrating a communications system 200 in accordance with the invention that supports both wired, wireless and voice over IP (VoIP) telephony in accordance with the invention. As shown in FIG. 1A, the system may include one or more computer networks, such as one or more local area networks (LANs) 280 and a wide area network (WAN) 281 wherein each LAN 280 is connected to the WAN 281 via a well known router 275. Each LAN is connected to one or more wireless access points 285 which are in turn connected wirelessly to one or more personal communication devices (PCD) 210. In a preferred embodiment, 802.11 wireless access points are being used. In accordance with the invention, the PCD may comprise a laptop computer, a PocketPC device, a handheld device, a portable digital assistant and/or any other computing devices with sufficient processing power to execute one or more software applications that implement a VoIP phone on the PCD. The PCDs communicate with an access point 285 in order to provide VoIP telephony in which the PCD provides a user interface (such as the example shown in FIG. 2B) that permits the user to make a telephone call using the PCD. The voice of the user is converted into digital form and sent with digital data for the communications session including the digital voice data through the access point 285 and across the LAN 280 (to which the particular access point is connected) to a router 275 and then onto the WAN 281. The digital data for the phone call is then routed to the appropriate location, such as through a firewall 282 to a communications/computer network 283, such as the Internet 283, to a phone call manager 44 hosted by Telesym, or to a call manager 44 attached to the WAN 281 as shown. The call manager 44 may be one or more pieces of software being executed by a computer system, such as a desktop computer or server computer, that processes the VoIP telephone calls. As shown in FIG. 1, the system may further comprise a connector system 47, which links the VoIP system to a PBX 49 through the WAN 281. The connector system 47 may permit typical telephones 49a and cellular phones 49b to be connected to/from the PCDs 210. Thus, the system permits telephonic communications to occur between a PCD 210 user and another PCD user, between an outside telephone and a PCD user or between a PCD user and an outside telephone.

FIG. 1B depicts a general system architecture 200 for wired and wireless IP telephony. The environment consists of multiple personal communication devices (PCDs) 210 comprising various components that handle sound or video. Each PCD 210 includes a CPU 215 having memory 220 in communication with an IP communication means 225, nominally a LAN Media Access Card (MAC), a wireless communications device 230, which is nominally a IEEE 802.11, Bluetooth, IR or similar compliant standard. The communications device may include LAN, Internet, and other wireless devices.

The PCD 210 further includes an I/O port 235 for audio or video importing and exporting, audio jacks 240 and optionally internal speakers and/or microphone 245, which are all in communication and controlled by CPU 215. The PCD 210 may also include external speakers and a microphone 255. Interactive sound communication occurs in a path from the microphones of one PCD 210 to the speakers of another PCD 210, and vice-versa. Each component may contribute to latency. In addition to the physical components shown in FIG. 1A and FIG. 1B, there may be software components that may also contribute to latency, such as the sound codecs (coder and decoder) that is described in more detail in U.S. Provisional Patent Application No. 60/504,169 filed on Sep. 18, 2003 and entitled "Codec System and Method" which is incorporated herein by reference.

In a typical operation, the PCD 210 connects via a LAN switching network 260/280, such as an Ethernet switch or hub or similar type network device. The LAN 260/280 is normally connected to an IP routing device 265, such as a standard IP standalone router or a PC or similar device configured for routing. The IP routing device 265 is in communication with a communication switching network 270, such as the Internet or other communications network, which is further in communication with an IP routing device 275, such as a typical router as described above. As depicted in FIG. 1B, the PCD 210 can be connected to a LAN 280 or wireless access point 285 and 290 either hardwired or via a RF/wireless connection. Now, the personal computing device 210 and its user interface will be described in more detail.

Figure 1C:
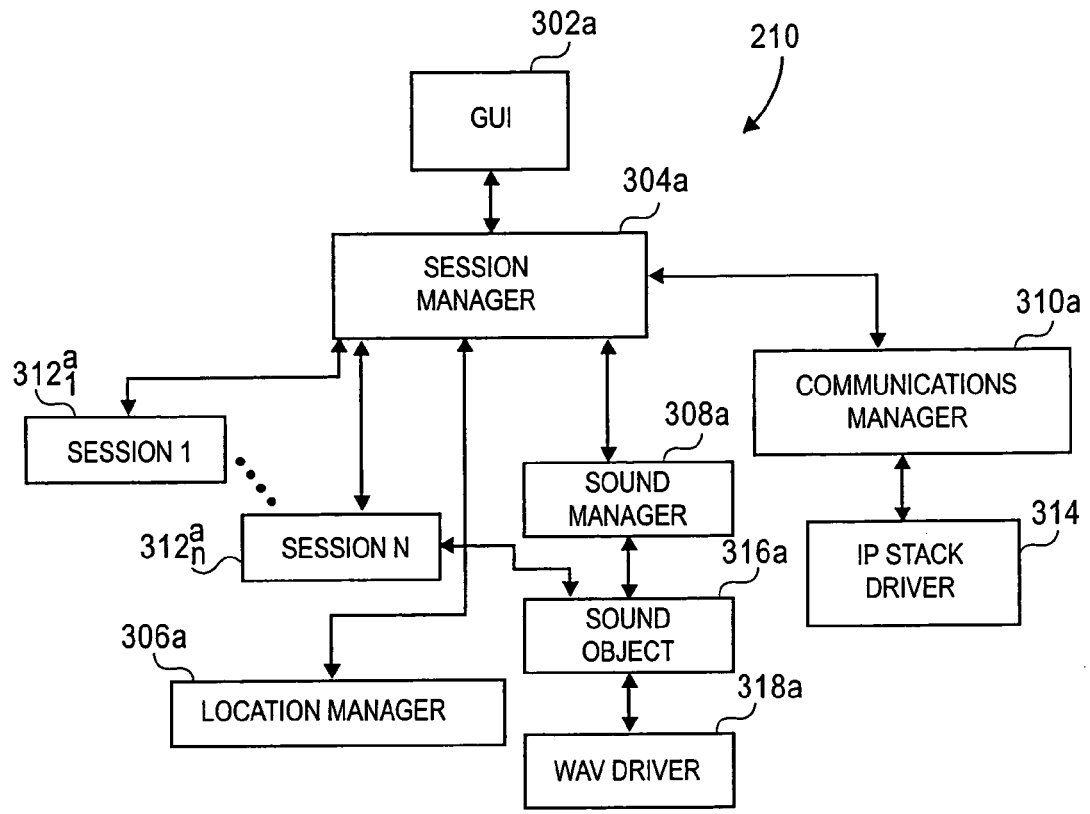
FIG. 1C is a block diagram of a personal communications device that communicates using the wireless voice over IP communications system shown in FIG. 1A.

FIG. 1C is a block diagram of a personal communications device 210 that communicates using the wireless voice over IP communications system shown in FIG. 1A. In FIG. 1C, the logical structure of the PCD is shown as opposed to the physical structure that is shown in FIG. 1B. The blocks shown in FIG. 1C may be collectively referred to as a symphone process that implements the communications system. Each of the elements shown in FIG. 1C may be implemented as one or more pieces of software code being executed by the PCD or each may be an embedded hardware device within the PCD. In a preferred embodiment, the modules described below may be implemented using object oriented software code and be represented as objects. As shown, the PCD may include a graphical user interface module 302a that control the user interface displayed to the user, such as that shown in FIG. 1D. The PCD may further include a session manager module 304a, a location manager module 306a, a sound manager module 308a and a communications manager module 310a. The session manager module 304a controls the overall operation of the communications system and each communications session, such as Session1-SessionN $312a_1$ to $312a_n$, and controls the other modules of the system as shown. The communications manager module 310a may control the IP communications traffic and protocols, such as by sending commands/receiving data from an IP stack driver 314a, of the PCD, communicate the data from the IP stack driver to the session manager and communicate data from the session manager to the IP stack driver. The location manager 306a may track the location of each PCD communicating with the particular PCD. The sound manager 308a controls and generates the voice/audio data of the PCD and may include, for example, a codec that compresses/decompresses the audio data. To this end, the sound manager 308a may generate a sound object 316 that is in turn passed to a way driver 318a that generates the requisite sounds. When there is an active communications session, such as SessionN in FIG. 1C, SessionN may also control the generation of the sound object 316a. In accordance with the invention, each PCD may also include a library routine/computer program (not shown) that, upon a request, generates a globally unique random number identifier that is described in more detail below.

Figure 1D:
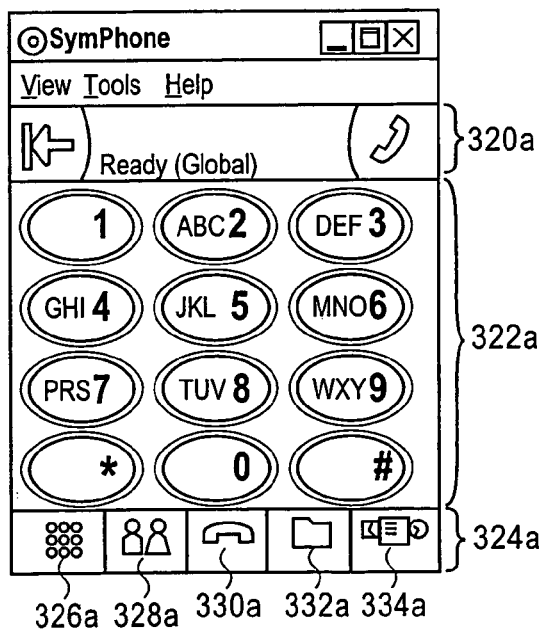
FIG. 1D illustrates an example of the user interface of the personal communications device shown in FIG. 1C.

FIG. 1D is a diagram illustrating an example of the user interface associated with the personal communications device 210 of FIG. 1C. The user interface of the device may include a display portion 320a, an interface portion 322a (that currently displays a dial pad) and a tasks bar portion 324a. The display portion 320a displays the status of the device and any active/current calls. The user interface portion 322a permits the user to interact with the symphone process and the PCD, such as by entering a telephone number or DTMF generated tones into the device when the dial pad is displayed and the tasks bar portion 324a may include a dial pad tab 326a (the dial pad tab is selected in FIG. 1D and the dial pad user interface is shown in FIG. 1D), a contacts tab 328a that provides a user interface to access a contacts program, a call tab 330a to access call information, a file tab 332a to store and retrieve files/messages and an intercom tab 334a that permits the user to initiate a call with a group of people.

Figure 2:
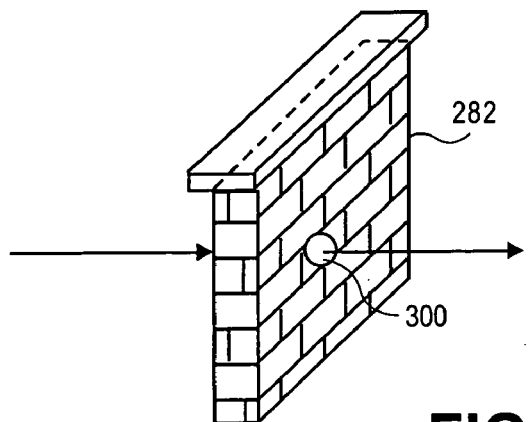
FIG. 2 is a diagram illustrating a firewall and a firewall port.

FIG. 2 is a diagram illustrating a firewall 282 and a firewall open port 300. As is well known, a firewall is a hardware/software device that restricts access to a computer network. For example, a corporate intranet is typically protected from external access via a firewall so that it is difficult for an external user, such as a computer hacker, to enter the computer network and perform mischievous actions. A firewall has a plurality of holes or opened ports (communications paths) through which data may pass. Many typical opened ports are well known. In order to increase the security of the firewall, a user may close one or more of the ports so that the access paths to the computer network is more limited. In some situations, a user may close as many ports as possible in order to restrict access to the network. Thus, it is often very difficult to convince a user that he/she should open up more ports so that a particular functionality may be used. For example, for a VoIP system, it is difficult to convince a user that several additional ports must be opened in order to provide a communications path for the VoIP data as that results in more access points into the computer network. It is particularly difficult to convince a user to open large ranges of ports, as may be necessary for some VoIP protocols. The communications protocol in accordance with the invention permits a plurality of voice over IP (VoIP) communications sessions or other data sessions to be carried out through a single port of the firewall as will now be described.

Figure 3:
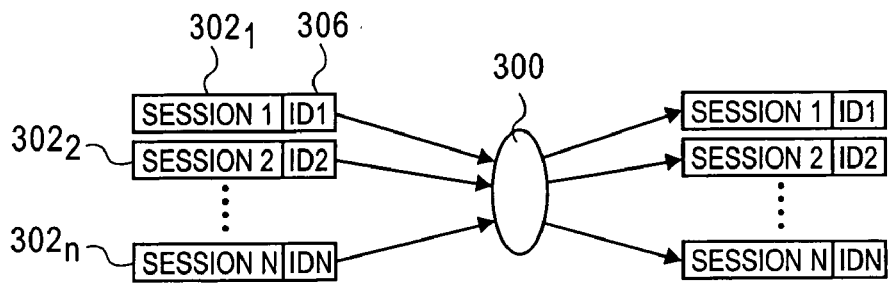
FIG. 3 is a diagram illustrating a method for sending a plurality of conversations over a single port in a firewall in accordance with the invention.

FIG. 3 is a diagram illustrating a method for sending a plurality of data streams, such as a plurality of communications sessions, through a single opened port or pinhole 300 in a firewall 282 in accordance with the invention. In accordance with the invention, one or more data streams ($302_1$, $302_2$, ..., $302_n$), such as a telephony VoIP communications session in this example, are sent through the single port/pinhole 300 of the firewall so that any security concerns associated with the communications system are reduced. Each session might be, for example, a telephone conversation between two portable communications devices over the VoIP system described above. To facilitate the communications of these one or more communications sessions through the single opened port 300, each communications session has an unique identifier 306 so that each communications session and its data are identified. In particular, each communications session may include a data portion 304 and an identification portion 306 as shown. The data portion may carry the communications data as well as control data for the communications session while the identification portion stores a globally unique identification in accordance with the invention. More details of the identification portion and the data portion are described below. As seen in FIG. 3, the communications protocol (as described below) and the globally unique identification (as described below) permit the one or more communications sessions to travel across the same single port of the firewall because the packets of each communications session are uniquely identified with minimal overhead data. Now, more details of an example of the data structure of the command packets and sound packets in accordance with the invention will be described.

Figure 4:
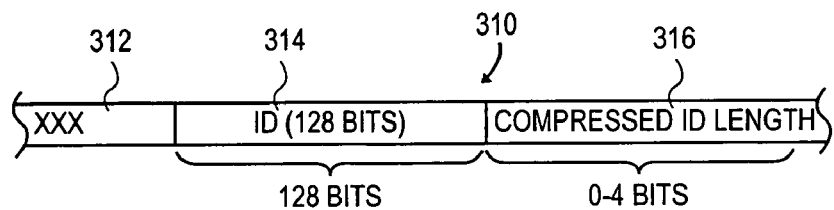
FIG. 4 is a diagram illustrating an example of the data structure for a command packet in accordance with the invention.

FIG. 4 is a diagram illustrating an example of the data structure for a command packet 310 in accordance with the invention. In the communications protocol, the command packets 310 are sent periodically during a communication session. These command packets may be sent, in a preferred embodiment, every half (½) second during a communications session. As shown, the command packet comprises a first portion 312, an identification portion 314 and a compressed identification length portion 316. The first portion 312 contains various data that is in a typical command/overhead/header packet. Thus, the command packet may have other data, in addition to the identification portion and the compressed identification length portion, such as the party identification code. The invention is neither limited to any particular type of data in the first portion 312 nor it is limited to the order in which the enumerated elements appear. The identification portion 314 contains a globally unique identification code. The generation of this globally unique identification code in accordance with the invention is described below with reference to FIG. 9. In a preferred embodiment, the globally unique identification code may be 128 bits long. However, in accordance with the invention, the globally unique identification code may be any number of bits, such as 256 bits, 512 bits, 377 bits, 2048 bits, etc., depending on the user's comfort with a possible identification code collision as described below in more detail. In accordance with the invention, the entire globally unique identification code is contained in each control packet. The control packet 310 also has the compressed identification length portion 316 that contains data indicating the number of bytes for a compressed globally unique identification code as described in more detail below. The compressed globally unique identification code reduces the amount of overhead data that is sent in each data packet (shown in FIG. 5) as described below in more detail. Typically, this portion 316 may be 0-4 bits that may be used to indicate that a 0 byte to 16 byte long compressed globally unique identification code (assuming a 128 bit globally unique identification code). In accordance with the invention, the value contained in the compressed globally unique identification code length portion 316 may be initially assigned during a communications session set-up, but then altered during the communications session. Therefore, for example, a longer length compressed globally unique identification code may be required initially since a large number of simultaneous communications sessions are occurring, but then a shorter length compressed globally unique identification code may be used (as described below) at some later point. The control packet in accordance with the invention provides authentication for the data packets since the control packet contains the entire globally unique identification code (and the identification code for the party) and permits each party of the communications session to periodically receive the full globally unique identification code of the other party. The globally unique identification code in accordance with the invention uniquely identifies each communications session for any party using the communication system (even when each party is generating its own identification number and there is no central identification generation, system or repository) and is capable of being compressed so that each data packet may contain only the compressed identification. An example of the data packet in accordance with the invention will now be described.

Figure 5:
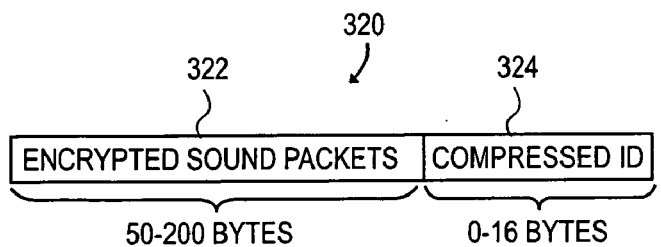
FIG. 5 is a diagram illustrating an example of the data structure for a data packet in accordance with the invention.

FIG. 5 is a diagram illustrating an example of the data structure for a data packet 320 in accordance with the invention. In a preferred embodiment, the data packet contains sound data for a voice over IP telephone call, but the data packet may also contain other communications data or other digital data. In accordance with the invention, the data packets are the packets that contain the data being communicated during the communications session. These packets are therefore sent much more frequently than the control packets and it is therefore desirable to limit the overhead data, which must be sent with each data packet. In general, for the voice over IP example, each data packet may contain 25-200 bytes depending to the level of sound data compression being used. For example, with a sound compression level of 80 Kbits/second, each data packet may contain approximately 200 bytes of sound data. The invention, however, is not limited to any particular number of bits/bytes in the data packets. For a typical well known data packet, the port identifier overhead may be 2 bytes. For the data packet in accordance with the invention, the overhead data may be 0, 1, 2, up to 16 bytes for a 128 bit globally unique identification code. In accordance with the invention, most data packets have overhead data of 0 to 2 bytes, which is, on average, significantly smaller than the typical overhead data.

As shown in FIG. 5, the data packet may include a data portion 322 and a compressed identification portion 324 and may contain other known data. In the example shown in FIG. 5, the data portion 322 contains encrypted sound data, which is 50-200 bytes. The sound data is encrypted to ensure privacy of the communications session. The compressed identification portion 324 contains a compressed identification code (0-16 bytes) that uniquely identifies each data packet as belonging to a particular communications session. In accordance with the invention, this compressed identification code is significantly smaller than the full globally unique identification code sent in the control packets. In a preferred embodiment, the compressed identification code 324 is located at the end of the data packet and is not encrypted so that it can be viewed and adjusted as needed without having to decrypt and perhaps then re-encrypt the sound packet data. Now, a communications protocol in accordance with the invention that utilizes these control and data packets will be described.

Figure 6:
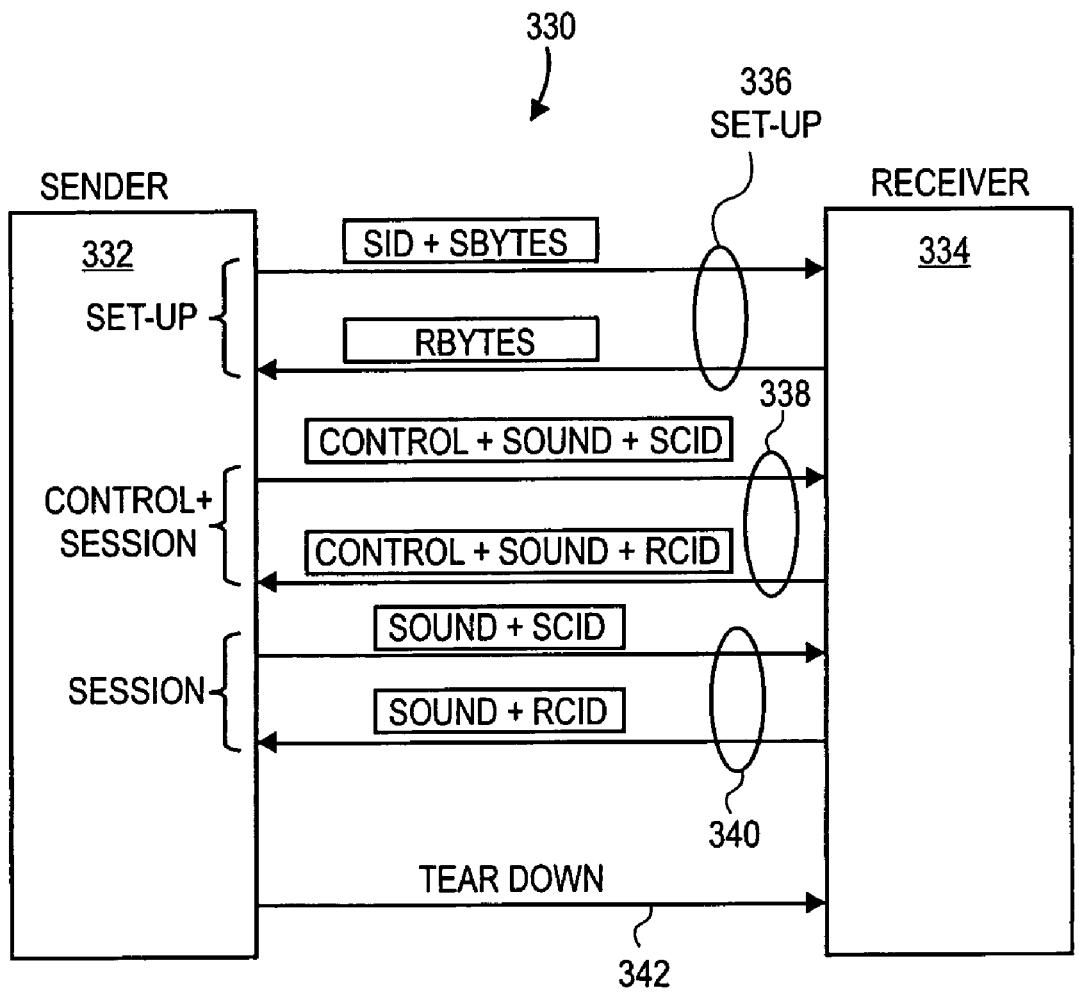
FIG. 6 is a diagram illustrating a communications protocol in accordance with the invention that utilizes the compressed identification in accordance with the invention.

FIG. 6 is a diagram illustrating a communications protocol 330 in accordance with the invention that utilizes the compressed identification codes in accordance with the invention. The communication protocol is shown in the context of a voice over IP communications session. However, the communications protocol in accordance with the invention may be used with any digital data communications session. The communications protocol may include a set-up protocol 336, a control protocol 338, a data protocol 340 and a tear-down protocol 342. The set-up protocol 336 sets-up the communication session between a sender 332 (also known as a PCD in an originator mode) and a receiver 334 (also known as a PCD in a responding mode) wherein the sender and receiver each may be a computing resource that is executing an application, such as a voice over IP application, to communicate data over a computer network. For example, the sender and receiver may each be a portable communications device as described above that are conducting a voice over IP conversation or each may be a server that is managing a plurality of voice over IP calls and any other combination. The control protocol 338 occurs periodically, such as once every half second in a preferred embodiment, and is when both data and control packets are communicated between the sender and receiver. The data protocol 340 is the normal data communications protocol in which data is being communicated between the sender and receiver. The tear down protocol 342 is when the communications session between the sender and receiver is completed and the communications session between the sender and receiver is terminated.

Returning to the set-up protocol, the sender 332 may generate a globally unique identification for the new communications session (SID) and then determine the number of bytes in a compressed identification code the sender needs to avoid a collision (S bytes). For example, if the sender does not have any other active communications sessions presently, the number of bytes for the compressed identification code is "0". As another example, if the sender currently has two other active calls, the number of bytes for the compressed identification code may be "1" in that he requires at least one byte of the globally unique identification code in each data packet to ensure that the sender can distinguish the communication session for that data packet. The sender may then send a message to the receiver that contains the SID, the number of bytes for the compressed identification code and other set-up information such as the unique identification code of the sender and other known information. In response, the receiver 334, during the set-up protocol 336, may receive the SID and compare it to its current communication session identifiers to determine the number of bytes that the receiver needs in order to uniquely identify the particular communication session. The receiver may then generate a message to the sender that contains his number of bytes that the receiver needs in order to uniquely identify the particular communication session (R bytes) as well as other well known set-up information such as the unique identification of the receiver. This set-up protocol permits the sender and receiver to agree on the relevant parameters for the communication session, which might, for example, include the parameters for the audio compression being used in the particular session. When the set-up protocol is complete, the sender and receiver have each received the compressed identification length information (R bytes and S bytes, respectively) of the other party so that each party knows the length of the compressed identification (CID) to send to the other party during the communications session.

The control protocol 338 occurs periodically during the communications session and results in control packets and data packets, as described above, being sent by the sender and receiver. Thus, control packets and the data packets with a compressed identification code (CID) are exchanged by the sender and receiver. The sender compressed identification code (SOD) may include the number of bytes of the globally unique identification code as requested by the receiver (R bytes) and the receiver compressed identification code (ROD) may include the number of bytes of the globally unique identification code as requested by the sender (S bytes). In accordance with the invention, the SCID and the RCID do not need to be the same length as the sender and receiver, independently, determine the number of bytes it requires for unique identification. Thus, the sender and receiver each independently determine the minimum number of bytes of the globally unique identification code required for identification. For example, if the sender is a portable communications device that does not have any other active calls (which is a typical situation) and the receiver is a server that has 100 other active calls (since it acts as a gateway for various senders), then the number of bytes for the compressed identification code for the sender is "0" and the number of bytes for the compressed identification code for the receiver may be "2". Thus, the SCID is 2 bytes in length and the RCID is 0 bytes in length. As described above, as other communications sessions are started or terminated, the value of the number of bytes for the compressed identification code for the sender or receiver may be adjusted.

The data protocol 340 is an optional data communications scheme during which data packets only are being communicated between the sender and receiver. Thus, as shown, only the sound data and the compressed identification code are being communicated. This can be the state of the communications session at most times. The insertion of the compressed identification code (RCID or SCID) has significant bandwidth implications as each data packet is significantly smaller than a typical 16 byte overhead. The tear-down protocol 342 occurs when the communications session has been completed and the communications session is terminated. During this protocol, both the sender and receiver remove the identification code from their list of current communications sessions so that both the sender and receiver can, for example, adjust the number of bytes required to uniquely identify other communications sessions.

The above protocol works for typical communications sessions between one entity and one or more entities (e.g., a point to one or more points of communication.) However, a slightly different protocol is required for an intercom/broadcast communications in which an entity (the sender) broadcasts a message to a plurality of receivers who cannot or do not normally respond. In a broadcast communication, the receivers are not specifically identified and therefore each receiver cannot communicate its number of bytes to determine the globally unique identification code as described above. Therefore, for a broadcast communication session, the above communications protocol may be modified in several different manners. In one example, the sender assigns sufficient bytes for its local network, such as 4 bytes, and then adjusts the number of bytes upwards as necessary for each individual receiver as needed. In another example, the sender listens to the network prior to sending the broadcast message and determines the existing identification codes prior to the broadcast. The sender then generates its globally unique random number identification code, compares it to the existing identification codes and re-generates the identification code until it is unique if a conflict occurs. Alternatively, the sender simply includes as many bits as necessary for uniqueness.

The communications protocol in accordance with the invention is also less susceptible to packet losses than the typical communications protocol. In particular, most protocols use a request/response paradigm in which the sender initiates a message and expects/waits for a response prior to continuing the protocol. Thus, if the response is lost (due to packet loss), the typical protocol might have to start again or fail. In contrast, the communications protocol described above is not a request/response type system as the sender and receiver both simply send their current state to the other party (using the control packets and the data packets) so that lost packets do not necessarily delay/halt the protocol. Further, since the entire globally unique identification code is periodically transmitted between the parties, a loss of some packets is unlikely to remove all of the control packets. Now, the steps taken by the sender and receiver during the above protocol will be described in more detail.

Figure 7:
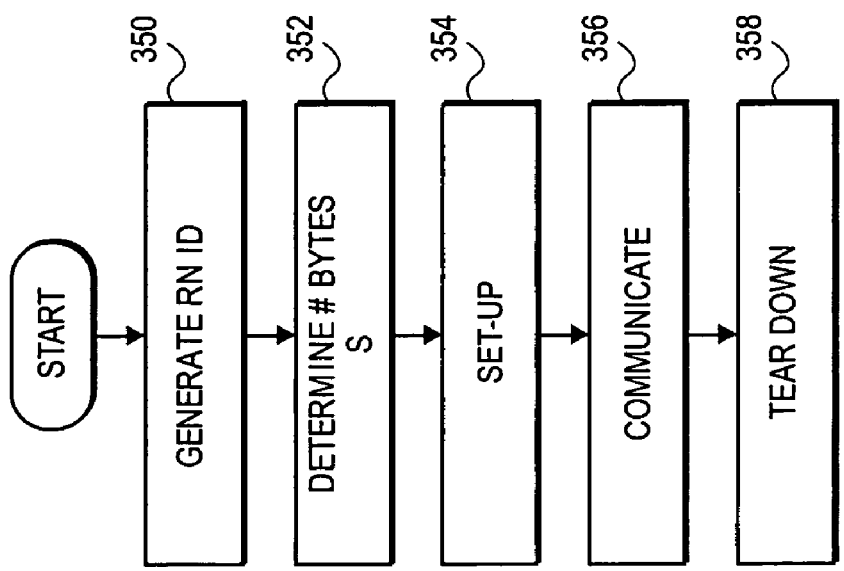
FIG. 7 is a flowchart illustrating the steps performed by a sender of a communication session shown in FIG. 6.

FIG. 7 is a flowchart illustrating the steps performed by a sender 332 of a communication session shown in FIG. 6. In step 350, the sender generates a globally unique identification code (generated from a random number in a preferred embodiment) and, in step 352, determines the number of bytes of a unique identification code that are required by the sender. In step 354, the sender communicates that data as well as other known set-up data to the receiver during the call set-up process. In step 356, the sender communicates data with the receiver using both the control and data protocols shown above. In step 358, the communications session is torn down and terminated.

Figure 8:
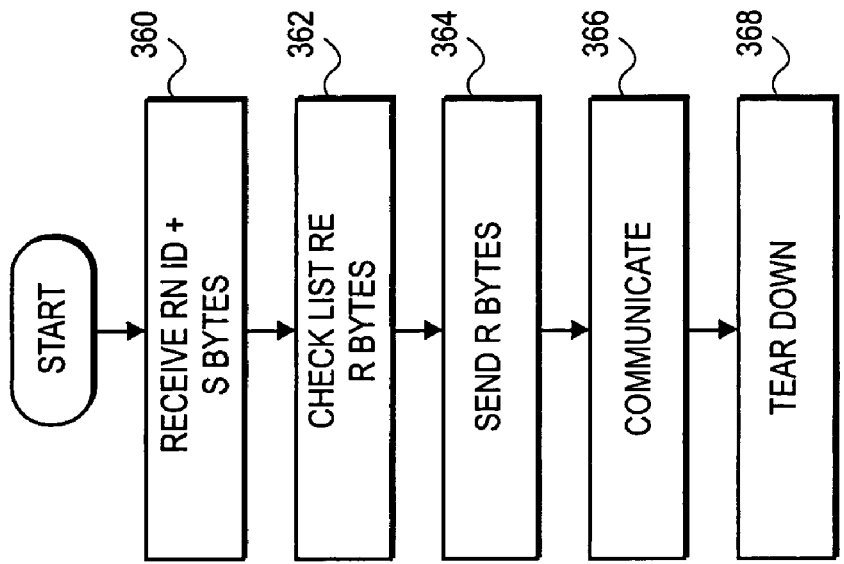
FIG. 8 is a flowchart illustrating the steps performed by a receiver of a communication session shown in FIG. 6.

FIG. 8 is a flowchart illustrating the steps performed by a receiver 334 of a communication session shown in FIG. 6. In step 360, the receiver receives the globally unique identification code and the sender's required number of bytes. In step 362, the receiver compares the globally unique identification code to his/her list of active communications sessions and determines the number of bytes that the receiver must be sent to uniquely identity the communications session. In step 364, the receiver sends its required number of bytes to the sender and then communicates data in step 366 using the control and data protocols. The communication session is then torn down in step 368 and terminated. In this manner, the amount of overhead data in each data packet is minimized (due to the SCID and RCID) yet each data packet is uniquely identified with a particular communications session. One advantage of the communications protocol is that multiple communications sessions may be communicated through a single open port on a firewall. Now, a method for generating the globally unique identification number and the compressed identification number in accordance with the invention will be described in more detail.

FIG. 9 is a flowchart illustrating a preferred method 370 for generating a compressed globally unique identification in accordance with the invention. In step 372, a random number identification code is generated. The detail of the generation of the random number identification code are described below. Then, a compressed identification code may be determined in step 374. The compressed identification code is a predetermined number of bytes of the random number identification code that are required by the particular party of the communications session to uniquely identify the communications session. The details of the generation of the compressed identification code are described below with reference to FIG. 10. The shorter compressed identification code is made possible, in part, by the random number identification code since a random number is likely to be distinguished from another number (random or not) with fewer bytes than non-random numbers.

The random number generation process preferably generates a cryptographically strong random number. There are many known techniques for generating a cryptographically strong random number sequence, such as a cryptographically strong hash function. As is well known, one must start with a seed with random bits so that the same numbers are not generated by distinct computer-based random number generators. The seed with the random bits may be generated in various manners. For example, the computer may measure an analog process, such as the drive signal for a motor, so that a random signal is generated with a random probability. As another example, the computer system may measure a physical process, such as the number of photons from a light source over predetermined intervals, to generate the seed value. An another example, the computer may compare two clocks, such as the clock in the CPU and a real-time clock, and use differences between the two clocks to generate the random number seed. Thus, based on the random seed and a well known random number generator, a random number of a particular number of bits may be generated.

The random number is then used as the globally unique identification number in accordance with the invention. The length of the random number (which can vary in accordance with the invention) determines how likely/unlikely it is that two randomly generated numbers are identical. In accordance with the invention, since the communications system is spread over a plurality of entities that are independently establishing a new communications session and therefore generating a new communication session identification code, the random number must be sufficiently large so that the chances of an identical communications session identification are low. One advantage of the globally unique random number identification code is that each user of the communications system may independently generate its own globally unique identification code without any fear of overlapping/conflicting with other globally unique identification codes. In a preferred embodiment of the invention, a 128 bit random number is used. The chances of an identical globally unique identification code using 128 bits is very small. In particular, assuming 4 billion calls per day that are stored in a database for 100 years, the probability of a collision (two identical identification codes in the database) is less than 1 in 4 billion which is a very insignificant chance. If a user of a communications system would like to have a smaller chance of collision, then a larger sized random number, such as 1024 bits, may be used. Thus, a user may increase or decrease the chance of conflict (and increase or decrease his level of comfort and concern) by changing the number of bits in the globally unique random number identification code. The changing of the bits in the globally unique random number identification code does not affect the communications protocols so that the level of security of the communications protocols may be easily changed/modified.

The globally unique random number identification code has another advantage over typical identification schemes. In particular, the globally unique random number identification code makes it impossible to extract any information about the parties to the communications session so that, as described above, the globally unique random number identification code may be sent unencrypted. Further, it is impossible to even determine that the globally unique random number identification code, except by its position in packets, is in fact an identification code. Now, a method for determining a compressed identification code length in accordance with the invention will be described.

Figure 10C:
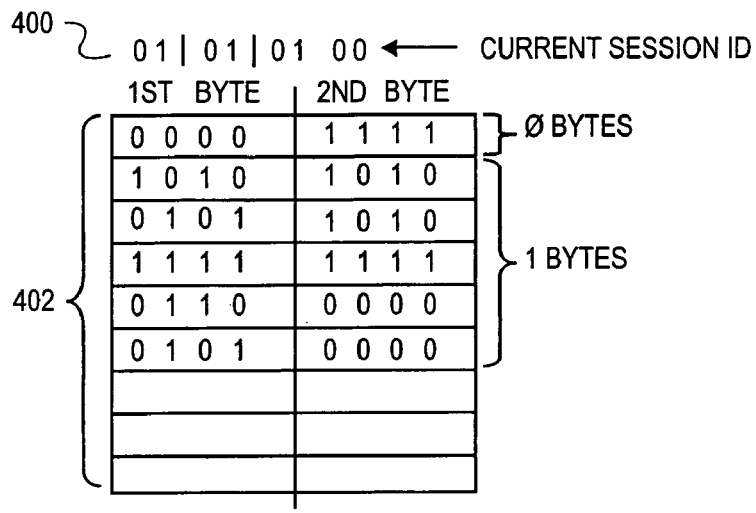

FIGS. 10A-10C are diagrams illustrating a compressed identification length determination method 380 and example in accordance with the invention. As shown in FIG. 10A, a list of the different length compressed identification codes and their associated communication session capacities is set forth. For example, a zero length compressed identification code (no identification code) may be used when a particular sender/receiver has no other active calls and therefore there is no need for an identification code. A 1 byte (8 bit) long compressed identification code permits 256 different communications sessions ($2^8$) to be identified while a 2 byte (16 bit) compressed identification code permits 64K different communications sessions ($2^{16}$) to be identified. In the extreme, a 16 byte compressed identification code can handle and uniquely identify up to $3.4 \times 10^{38}$ ($2^{128}$) separate communications sessions. Thus, as a particular sender/receiver handles more communications sessions, the length of the compressed identification code is increased to handle that situation. However, even a short compressed identification code (2 bytes) is capable of distinguishing up to 64K different communications sessions. Thus, in most situations, a 0-4 byte compressed identification code will be more than sufficient.

As shown in FIG. 10B, the method for determining the compressed identification code begins at step 382 when a sender generates a new random number globally unique identification code or a receiver receives a new random number globally unique identification code. In step 384, the random number globally unique identification code is compared to a list of current identifications for currently active communications sessions (see FIG. 10C for example). In step 386, the sender/receiver determines if the new globally unique identification code matches a zero length globally unique identification code (i.e., there is no other O-length code active communication session) in step 386 and sets the length of its required compressed globally unique identification code to zero if there is no match in step 388. In step 390, if the sender/receiver has another active communications session, then the sender/receiver determines if the new globally unique identification code matches the first 1 byte length of any of its other globally unique identification codes and assigns a 1 byte length compressed globally unique identification code if the new globally unique identification code does not match the first 8 bits of the other globally unique identification codes distinguished at one byte. This process is continued until a length of the compressed globally unique identification code is determined which permits the new globally unique identification code to be distinguished from all other existing on the sender/receiver at the current time. As shown in FIG. 10C, an example of that process with a new globally unique identification code 400 and a list 402 of existing globally unique identification codes is shown. In this example, the globally unique identification codes are all 8 bits long for illustration purposes only as these codes are 128 bits long in a preferred embodiment. As shown, when the new globally unique identification code 400 is compared to the list 402, it is apparent that the new code 400 matches an existing code's first byte. Thus, in this example, the current code 400 is assigned a 2 byte length compressed code since 2 bytes of the new code 400 will distinguish it from all other existing codes. Now, several examples of the communications protocol will be described.

Figure 11:
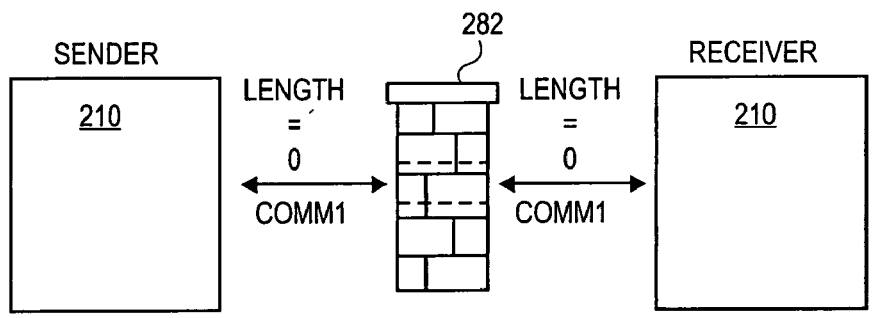
FIG. 11 illustrates an example of the communications protocol between two portable communications devices.
Figure 12:
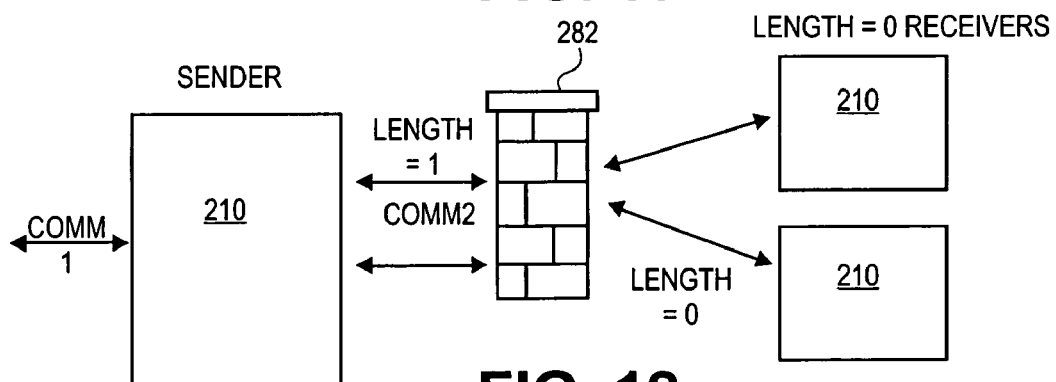
FIG. 12 illustrates an example of the communications protocol between three portable communications devices.
Figure 13:
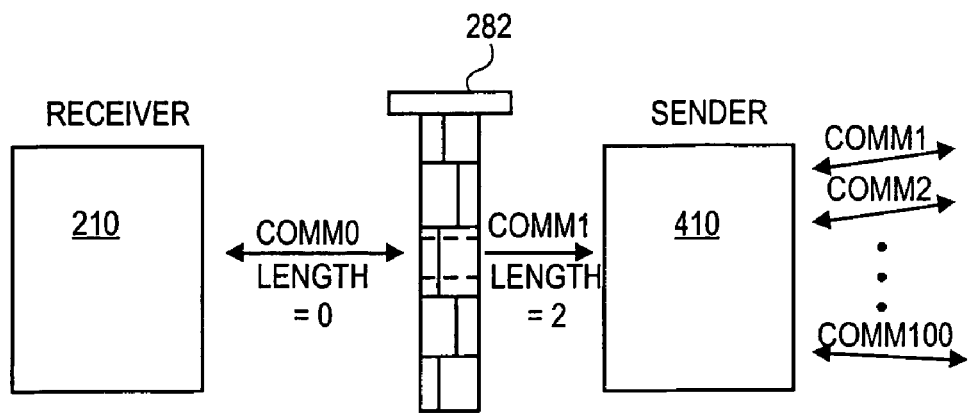
FIG. 13 illustrates an example of the communications protocol between a portable communications device and a server.

FIG. 11 illustrates an example of the communications protocol between two portable communications devices 210 wherein there is a sender and a receiver. In this example, the portable communication devices each do not have any other current communication sessions so that each assigns a compressed identification code of zero since each portable communications device is capable of distinguishing the current communications session without any compressed identification code. FIG. 12 illustrates an example of the communications protocol between three portable communications devices 210. In this example, the two receivers both have no other active communications sessions and therefore assign a compressed identification code of zero bytes while the sender has the two new communications sessions as well as one other existing communications session and therefore assigns a compressed identification code of one byte. FIG. 13 illustrates an example of the communications protocol between a portable communications device 210 and a server 410 wherein the server might be a voice over IP gateway that is handling numerous communications sessions, such as the existing 100 sessions (COMM1-COMM100) as well as the new communications session. Thus, the server assigns a compressed identification code of two bytes (that handles up to 64K communications sessions) while the receiver (the portable communications device 210) assigns a compressed identification code of zero bytes since the receiver does not have any other existing communications sessions. It is apparent that asymmetric CIDs are possible and likely since each device that is part of the communications session to able to achieve the smallest overhead for the CID regardless of the situation of the other device. Now, a method for the dynamic reassignment of the compressed identification code lengths will be described.

Figure 14:
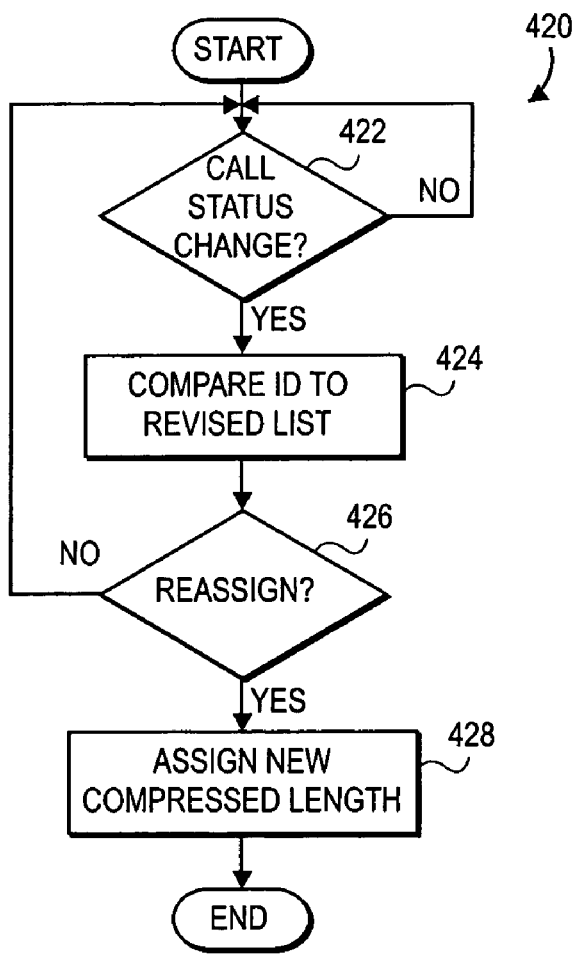
FIG. 14 is a flowchart illustrating a method for dynamic reassignment compressed identification code length values.

FIG. 14 is a flowchart illustrating a method 420 for dynamic reassignment of compressed identification code length values. This process is carried out assuming that at least one existing communications session is occurring on a sender or receiver. In step 422, the sender/receiver determines if the status of any communication sessions had changed and loops back to step 422 if no change has occurred. If a change of a communications session has occurred (it has been terminated and the identification code removed from the active communications sessions) then the sender/receiver compares the identification code of the current communication session to a revised list of the active communications sessions in step 424. In step 426, the sender/receiver determines if the current communication sessions identification code can be reassigned to a shorter length compressed identification code. For example, assuming that the current identification code had been previously assigned a 2 byte compressed code length and the last eight bits are "00001111" because there was a second communications session with an identifier of "00001010", if that second communications session is terminated and there are no other active communication sessions whose identification begins with "0000", then the current communications session may be reassigned with a compressed code length of 1 byte since that first byte "0000" now distinguishes it for all other active communications sessions. In this manner, the length of the compressed identification code for a communications session may be dynamically reduced during the pendancy of the communications session.

While the foregoing has been with reference to a particular embodiment of the invention, it will be appreciated by those skilled in the art that changes in this embodiment may be made without departing from the principles and spirit of the invention as defined by the appended claims.

The invention claimed is:

1. A personal computing device for use within a communications network, the device comprising:
   a communications application, being executed by a processor of the personal computing device, that can establish a communication session with a communications application of another personal computing device over a communications network;
   the communications application further comprising a session manager and a library that generates a globally unique random number identifier wherein, for each communication session, a globally unique random number identifier is generated that uniquely identifies each communication session and wherein the session manager generates a compressed globally unique identification, from the globally unique random number identifier, that is appended to each data packet exchanged with another session manager, the compressed globally unique identification having a length that is less than the length of the globally unique random number identifier and being generated based on any other active communication sessions associated with the communication application so that the compressed globally unique identification, for a particular communication session between the personal computing device and another personal computing device, may be different from the compressed globally unique identification of the other personal computing device.

2. The device of claim 1, wherein the session manager further comprises a communications manager with computer instructions to generate a command packet and the data packet to communicate the data over the communications network, the command packet further comprising at least at identifier portion and a compressed identifier length portion, the identification portion containing the globally unique random number identifier and the compressed identifier length portion containing the length of the compressed globally unique identification whose length is shorter than the globally unique random number identifier, and the data packet further comprising data and a compressed identifier portion containing the compressed globally unique identification having the length contained in the compressed identifier length portion of the command packet.

3. The device of claim 2, wherein the device is one of in an originator mode or a responding mode and wherein the communication manager, if the device is in the originator mode, further comprises computer instructions to generate a message containing the globally unique random number identifier and the compressed identifier length portion with a length less than the globally unique random number identifier that uniquely identifies a new communication session at the device given the existing communication sessions at the device and wherein the communications manager, if the device is in the responding mode, further comprises computer instructions to generate a message, in response to a message from an originator device, containing the compressed identifier length portion that uniquely identifies the new communication session for the responding device given the existing communication sessions at the responding device.

4. The device of claim 3, wherein the communication manager, if the device is in the originator mode, further comprises computer instructions to generate a control protocol that occurs periodically during the communication session, the control protocol further comprising computer instructions to generate at least one control packet and data packet that contain the globally unique random number identifier of the device and the compressed globally unique identifier of the device and wherein the communications manager, when the device is in the responding mode, further comprises computer instructions to generate at least one control packet and data packet that contain the globally unique random number identifier of the responding device and the compressed globally unique identifier of the responding device.

5. The device of claim 4, wherein the communications manager further comprises computer instructions to generate a message containing a data packet with the compressed globally unique identifier of the device to communicate the data with another personal computing devices.

6. The device of claim 2, wherein the communications manager further comprises computer instructions to encrypt the data in the data packet and to place the compressed globally unique identifier at the end of the data packet wherein the compressed globally unique identifier is not encrypted so that the compressed globally unique identifier may be easily replaced.

7. The device of claim 2, wherein the communications manager further comprises a module with computer instructions to adjust the length of the compressed globally unique identifier during the communications session, wherein the adjusting instructions further comprises computer instructions to determine that the status of one of the other communication session has changed so that the compressed globally unique identifier of the other communication session is no longer used, computer instructions to compare the compressed globally unique identifier of the particular communication session to the compressed globally unique identifiers of the other active communication sessions, and computer instructions to assign a new length to the compressed globally unique identifier of the particular communications session based on the comparison of the compressed globally unique identifier of the particular communication session to the other compressed globally unique identifiers so that the compressed globally unique identifier has a minimum length to uniquely identify the particular communication session and the compressed globally unique identifier is adjusted during the communication session.

8. The device of claim 7, wherein the assigning instructions further comprises computer instructions to reduce the length of the compressed globally unique identifier since a shorter length compressed globally unique identifier still uniquely identifies the particular communication session.

9. The device of claim 7, wherein the comparing instructions further comprises computer instructions to determine if a shorter length compressed globally unique identifier uniquely identifies the particular communication session.

10. The device of claim 1 wherein the data further comprises sound data.

11. The device of claim 1, wherein the computer instructions to generate the compressed globally unique identifier further comprises computer instructions to assign a zero length compressed globally unique identifier if the zero length compressed globally unique identifier uniquely identifies the communication session based on a comparison with of the compressed globally unique identifiers of the other active communication sessions, and computer instructions to assign, if the zero length compressed globally unique identifier does not uniquely identify the communication session, a one unit length compressed globally unique identifier if the one unit length compressed globally unique identifier uniquely identifies the communication session based on a comparison of the compressed globally unique identifiers so that the shortest length compressed globally unique identifier is used to identify each communication session.

12. The device of claim 11, wherein the computer instructions to generate the compressed globally unique identifier further comprises computer instructions to assign, if an "n" length compressed globally unique identifier does not uniquely identify the communication session, an "n+1" length compressed globally unique identifier if the "n+1" length compressed globally unique identifier uniquely identifies the communication session based on a comparison with the of the other compressed globally unique identifiers.

13. The device of claim 11, wherein the unit length further comprises a byte.

14. The device of claim 11, wherein the communication manager further comprising computer instructions to reassign the length of the compressed globally unique identifier during the communication session.

15. The device of claim 14, wherein the computer instructions to reassign the length of the compressed globally unique identifier further comprises:
   computer instructions to determine that the status of one of the other communication session has changed so that the compressed globally unique identifier of the other communication session is no longer valid;
   computer instructions to compare the compressed globally unique identifier of the particular communication session to the compressed globally unique identifiers of the other active communication sessions; and
   computer instructions to assign a new length to the compressed globally unique identifier of the particular communications session based on the comparison of the compressed globally unique identifier of the particular communication session to the other compressed globally unique identifiers so that the compressed globally unique identifier has a minimum length to uniquely identify the particular communication session and the compressed globally unique identifier is adjusted during the communication session.

16. The device of claim 15, wherein the computer instructions to assign the new length of the compressed globally unique identifier further comprising computer instructions to reduce the length of the compressed globally unique identifier since a shorter length compressed globally unique identifier still uniquely identifies the particular communication session.

17. The device of claim 15, wherein the computer instructions to compare the compressed globally unique identifier of the particular communication session to the other compressed globally unique identifiers further comprises computer instructions to determine if a shorter length compressed globally unique identifier uniquely identifies the particular communication session.

18. A communications system for communicating a plurality of voice communication sessions over a computer network, comprising:
   a first personal computing device having a communications application being executed by the first personal computing device;
   a second personal computing device having a second communications application being executed by the second personal computing device, the second communications application establishing a communication session with the communications application of the first personal computing device over a computer network;
   each communication application further comprising a session manager and a library that generates a globally unique random number identifier wherein, for each communication session, the globally unique random number identifier is generated that uniquely identifies each communication session and wherein the session manager further comprises computer instructions to generate a compressed globally unique identification, from the globally unique random number identifier, that is appended to each data packet exchanged with another session manager, the compressed globally unique identification having a length that is less than the length of the globally unique random number identifier and being generated based on any other active communication sessions associated with the particular communication application so that the compressed globally unique identification, for a particular communication session between the first and second personal computing devices, of the first personal computing device may be different from the compressed globally unique identification of the second personal computing device.

19. The system of claim 18, wherein each session manager further comprises a communications manager with computer instructions to generate a command packet and the data packet to communicate the data over the communications network, the command packet further comprising at least at identifier portion and a compressed identifier length portion, the identification portion containing the globally unique random number identifier and the compressed identifier length portion containing the length of the compressed globally unique identification whose length is shorter than the globally unique random number identifier, and the data packet further comprising data and a compressed identifier portion containing the compressed globally unique identification having the length contained in the compressed identifier length portion of the command packet.

20. The system of claim 19, wherein the communication manager of the first personal computing device further comprises computer instructions to generate a message containing the globally unique random number identifier and the compressed identifier length portion with a length less than the globally unique random number identifier that uniquely identifies a new communication session at the first personal computing device given the existing communication sessions at the first personal computing device and wherein the communications manager of the second personal computing device further comprises computer instructions to generate a message, in response to the message from the first personal computing device, containing the compressed identifier length portion that uniquely identifies the new communication session for the second personal computing device given the existing communication sessions at the second personal computing device.

21. The system of claim 20, wherein the communication manager of the first personal computing device further comprises computer instructions to generate a control protocol that occurs periodically during the communication session, the control protocol further comprising computer instructions to generate at least one control packet and data packet that contain the globally unique random number identifier of the first personal computing device and the compressed globally unique identifier of the first personal computing device and wherein the communications manager of the second personal computing device further comprises computer instructions to generate at least one control packet and data packet that contain the globally unique random number identifier of the second personal computing device and the compressed globally unique identifier of the second personal computing device.

22. The system of claim 21, wherein each communications manager further comprises computer instructions to generate a message containing a data packet with the compressed globally unique identifier of the associated personal computing device to communicate the data between the first and second personal computing devices.

23. The system of claim 19, wherein each communications manager further comprises computer instructions to encrypt the data in the data packet and to place the compressed globally unique identifier at the end of the data packet wherein the compressed globally unique identifier is not encrypted so that the compressed globally unique identifier may be easily replaced.

24. The method of claim 19, wherein the communications manager at each personal computing device further comprises a module with computer instructions to adjust the length of the compressed globally unique identifier during the communications session, wherein the adjusting instructions further comprises computer instructions to determine that the status of one of the other communication session has changed so that the compressed globally unique identifier of the other communication session is no longer used, computer instructions to compare the compressed globally unique identifier of the particular communication session to the compressed globally unique identifiers of the other active communication sessions, and computer instructions to assign a new length to the compressed globally unique identifier of the particular communications session based on the comparison of the compressed globally unique identifier of the particular communication session to the other compressed globally unique identifiers so that the compressed globally unique identifier has a minimum length to uniquely identify the particular communication session and the compressed globally unique identifier is adjusted during the communication session.

25. The system of claim 24, wherein the assigning instructions further comprises computer instructions to reduce the length of the compressed globally unique identifier since a shorter length compressed globally unique identifier still uniquely identifies the particular communication session.

26. The system of claim 24, wherein the comparing instructions further comprises computer instructions to determine if a shorter length compressed globally unique identifier uniquely identifies the particular communication session.

27. The system of claim 1 wherein the data further comprises sound data.

28. The system of claim 1, wherein the computer instructions to generate the compressed globally unique identifier further comprises computer instructions to assign a zero length compressed globally unique identifier if the zero length compressed globally unique identifier uniquely identifies the communication session based on a comparison with of the compressed globally unique identifiers of the other active communication sessions, and computer instructions to assign, if the zero length compressed globally unique identifier does not uniquely identify the communication session, a one unit length compressed globally unique identifier if the one unit length compressed globally unique identifier uniquely identifies the communication session based on a comparison of the compressed globally unique identifiers so that the shortest length compressed globally unique identifier is used to identify each communication session.

29. The system of claim 28, wherein the computer instructions to generate the compressed globally unique identifier further comprises computer instructions to assign, if an "n" length compressed globally unique identifier does not uniquely identify the communication session, an "n+1" length compressed globally unique identifier if the "n+1" length compressed globally unique identifier uniquely identifies the communication session based on a comparison with the of the other compressed globally unique identifiers.

30. The system of claim 28, wherein the unit length further comprises a byte.

31. The system of claim 28, wherein the communication manager further comprising computer instructions to reassign the length of the compressed globally unique identifier during the communication session.

32. The system of claim 31, wherein the computer instructions to reassign the length of the compressed globally unique identifier further comprises:
  computer instructions to determine that the status of one of the other communication session has changed so that the compressed globally unique identifier of the other communication session is no longer valid;
  computer instructions to compare the compressed globally unique identifier of the particular communication session to the compressed globally unique identifiers of the other active communication sessions; and
  computer instructions to assign a new length to the compressed globally unique identifier of the particular communications session based on the comparison of the compressed globally unique identifier of the particular communication session to the other compressed globally unique identifiers so that the compressed globally unique identifier has a minimum length to uniquely identify the particular communication session and the compressed globally unique identifier is adjusted during the communication session.

33. The system of claim 32, wherein the computer instructions to assign the new length of the compressed globally unique identifier further comprising computer instructions to reduce the length of the compressed globally unique identifier since a shorter length compressed globally unique identifier still uniquely identifies the particular communication session.

34. The system of claim 32, wherein the computer instructions to compare the compressed globally unique, identifier of the particular communication session to the other compressed globally unique identifiers further comprises computer instructions to determine if a shorter length compressed globally unique identifier uniquely identifies the particular communication session.

* * * * *